US010006761B2

(12) United States Patent
Wang et al.

(10) Patent No.: US 10,006,761 B2
(45) Date of Patent: Jun. 26, 2018

(54) METHOD AND SYSTEM FOR ON-LINE REAL-TIME MEASURING THE SURFACE TOPOGRAPHY AND OUT-OF PLANE DEFORMATION BY USING PHASE-SHIFTING SHADOW MOIRÉ METHOD

(71) Applicant: NATIONAL TSING HUA UNIVERSITY, Hsinchu (TW)

(72) Inventors: Wei-Chung Wang, Hsinchu (TW); Wen-Yi Kang, Hsinchu (TW); Ya-Hsin Chang, Hsinchu (TW); Hsuan-Hao Hsu, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days. days.

(21) Appl. No.: 14/065,650

(22) Filed: Oct. 29, 2013

(65) Prior Publication Data

US 2015/0029514 A1    Jan. 29, 2015

(30) Foreign Application Priority Data

Jul. 25, 2013   (TW) .............................. 102126587 A

(51) Int. Cl.
   *G01B 11/25* (2006.01)
(52) U.S. Cl.
   CPC .................. *G01B 11/254* (2013.01)

(58) Field of Classification Search
   CPC ..................................... G01B 11/254
   USPC .......................................... 356/512
   See application file for complete search history.

(56) References Cited

U.S. PATENT DOCUMENTS

| | | | |
|---|---|---|---|
| 5,488,477 A * | 1/1996 | de Groot | G01B 11/306 356/514 |
| 6,731,391 B1 * | 5/2004 | Kao et al. | 356/605 |
| 7,369,253 B2 | 5/2008 | Zwemer et al. | |
| 2009/0220143 A1 * | 9/2009 | Fournier | G01B 11/2545 382/154 |
| 2012/0038810 A1 * | 2/2012 | Taniguchi | H01L 27/14621 348/308 |
| 2012/0038986 A1 * | 2/2012 | Pesach | G01S 17/74 359/572 |
| 2013/0147919 A1 * | 6/2013 | Xia et al. | 348/46 |

* cited by examiner

*Primary Examiner* — Tarifur Chowdhury
*Assistant Examiner* — Omar Nixon

(57) ABSTRACT

The present invention is directed to a system and method for on-line real-time measuring the surface topography and out-of-plane deformation by using phase-shifting shadow moiré method. Digital Phase-Shifting Shadow Moiré Method is applied to a system, which receives the reflected images from the surface of transparent or non-transparent plate projected under a light beam passing through a grating. Next, by image correction program, the skewed interference fringe pattern is recovered to the image as if the image acquisition equipment is placed normal to the surface. Furthermore, the received images are processed with Phase-Shifting to show the surface topography of the plate.

2 Claims, 3 Drawing Sheets

METHOD AND SYSTEM FOR ON-LINE REAL-TIME MEASURING THE SURFACE TOPOGRAPHY AND OUT-OF PLANE DEFORMATION BY USING PHASE-SHIFTING SHADOW MOIRÉ METHOD

CROSS REFERENCE

The application claims priority of Taiwan Patent Application NO. 102126587, filed on Jul. 25, 2013, the content thereof is incorporated by reference herein.

BACKGROUND OF THE INVENTION

1. Field of the invention

The present invention is related to a surface measurement, and more particularly to a method and system for on-line real-time measuring the surface topography and out-of-plane deformation by using phase-shifting shadow moiré method.

2. Description of Related Art

Surface flatness is a common measurement specification over a wide range of manufacturing industries. Flatness critically affects, for example, the reliability and assembly yield of electronic products, the cosmetic appearance and handling characteristics of paper products, and the mechanical fit and functionality of fabricated metal components.

In recent years, lighter and thinner structure of the liquid crystal display (LCD) has become a trend. Correspondingly, the optical components in the back light module (BLM) have become much thinner. Thus, the structural strength of the optical components may be reduced. Light guide plate (LGP) is one of the essential components of a BLM. Warpage may be produced during the manufacturing process due to the lower structural strength of the LGP in a thinner thin film transistor liquid crystal display (TFT-LCD) as required by the market.

This phenomenon has been well known to us for a long time and various methods throughout the past have been proposed and utilized to measure the surface flatness, for example, Scanning Probe Microscopy, Atomic Force Microscopy, Confocal Microscopy, Phase Contrast Microscopy, Differential Interference Contrast Microscopy, etc.

The shadow moiré method is a simple and convenient optical technique for the measurement of surface topography and out-of-plane displacement. For a transparent object such as a LGP, based on the principle of the shadow moiré method, it's required to spray the reflective paint on the object's surface to make the interference fringe pattern sufficiently visible. However, the LGP may no longer be re-used or may be damaged during the process of painting or de-painting.

U.S. Pat. No. 7,369,253 discloses a measurement of sample surface flatness of a continuously moving sample. A conveyor continuously conveys a sample beneath a grating disposed at a non-zero angle with respect to the plane of conveyance. But the patent is used to measure the surface of objects, which comprise a mechanical component, such as a printed circuit board, a sheet material, such as paper, not the transparent materials. In the conventional way, the surfaces of objects are painted a thin layer to reflect the light to the camera for measuring the surface topography of transparent materials.

In view of the foregoing, a need exists in the art for a system and method for measuring surface flatness of continuously moving samples. In addition, a need exists for such a system and method to be efficient and cost-effective.

SUMMARY OF THE INVENTION

The primary objective of the present invention is to provide a method and system for on-line real-time measuring the surface topography and out-of-plane deformation by using phase-shifting shadow moiré method.

In order to accomplish the above objective, the method for on-line real-time measuring the surface topography and out-of-plane deformation by using phase-shifting shadow moiré method in accordance with the present invention comprises:

providing a substrate having a flat surface;

positioning a grating above the substrate with a distance, the grating being parallel with the substrate and being configured to project a light through a pattern to the flat surface;

projecting a light beam to the grating, and the light beam having an incident angle to the normal of the grating;

receiving the reflected light from the substrate at other side of the normal of the grating, wherein the light beam pass through the grating onto the flat surface and is reflected to pass the grating again for forming a fringe pattern image;

changing the distance of the substrate and the grating to receive a plurality of fringe pattern image for a phase value of the flat surface; and calculating the phase value to out-of-plane displacement for rebuilding a surface topography of the substrate.

In a preferred embodiment, the method includes projecting the light beam with a plurality of incident angles to receive a plurality of fringe pattern image respectively, wherein a fringe pattern image with the best contrast is selected to attain a selective incident angle.

In still another embodiment, the method includes receiving the reflected light with a plurality of reflective angles to attain a plurality of fringe pattern image respectively, and selecting a fringe pattern image with the best contrast to attain a proper reflective angle.

In a preferred embodiment, the method includes recovering skewed fringe pattern image to be a normalized fringe pattern image with image correction program.

The another objective of the present invention is to provide a system for on-line real-time measuring the surface topography and out-of-plane deformation by using phase-shifting shadow moiré method in accordance with the present invention comprises: a light source projecting a light beam on a substrate having a test plane; a reference grating disposed above the substrate with a distance and being parallel with the substrate for grading the light beam to the test plane; an image acquisition apparatus disposed above the reference grating and the substrate to capture at least one image comprising a shadow moiré fringe pattern, wherein the light beam passing through the reference grating onto the substrate and reflected to pass the reference grating again for forming a fringe pattern image; and a computer electrically coupled to the image acquisition apparatus to receive the image, and having a program module to read and process the image with phase-shift for measuring a surface topography of the substrate.

In a preferred embodiment, the light source is positioned in a light linear guide for projecting the light beam with a plurality of incident angles to capture a plurality of fringe pattern image respectively.

In still another embodiment, the computer has a program module configured to select a fringe pattern image with the best contrast and to attain a surface topography of the substrate.

In a preferred embodiment, the image acquisition apparatus includes an acquisition linear guide for receiving the reflected light with a plurality of reflective angles to receive a plurality of fringe pattern image respectively.

In yet another embodiment, the computer configured for selecting a fringe pattern image with the best contrast to attain a surface topography of the substrate.

To investigate the feasibility of obtaining the surface topography of a transparent object by employing the digital phase-shifting shadow moiré method without painting, fringe pattern generated from different capture angles with several incident angles were examined. With the help of the image correction program, it was found that skewed images obtained from different capture angles can be successfully recovered. The surface topography of the object can then be correctly determined.

Other objects, advantages and features of the present invention will become more apparent upon reading the following non-restrictive description of preferred embodiments thereof, given by way of example only with reference to the accompanying drawings.

BRIEF DESCRIPTION OF THE DRAWINGS

An embodiment of the invention will now be described, by way of example only, with reference to the accompanying drawings in which.

DETAILED DESCRIPTION OF THE INVENTION

The following description is merely exemplary in nature and is in no way intended to limit the present teachings, applications, or uses. Those of skill in the art will recognize that the following description is merely illustrative of the principles of the invention, which may be applied in various ways to provide many different alternative embodiments.

The invention relates to a measurement of the surface topography and out-of-plane deformation of transparent or non-transparent materials, e.g. glass plate, metal plate, light guide plate for back light module, which applies the digital phase-shifting shadow moiré method (DPSSM) to analyze the fringe pattern generated from interference between the grating and its projected grating on the object's surface, the topography of the object can be obtained.

Figure 1:
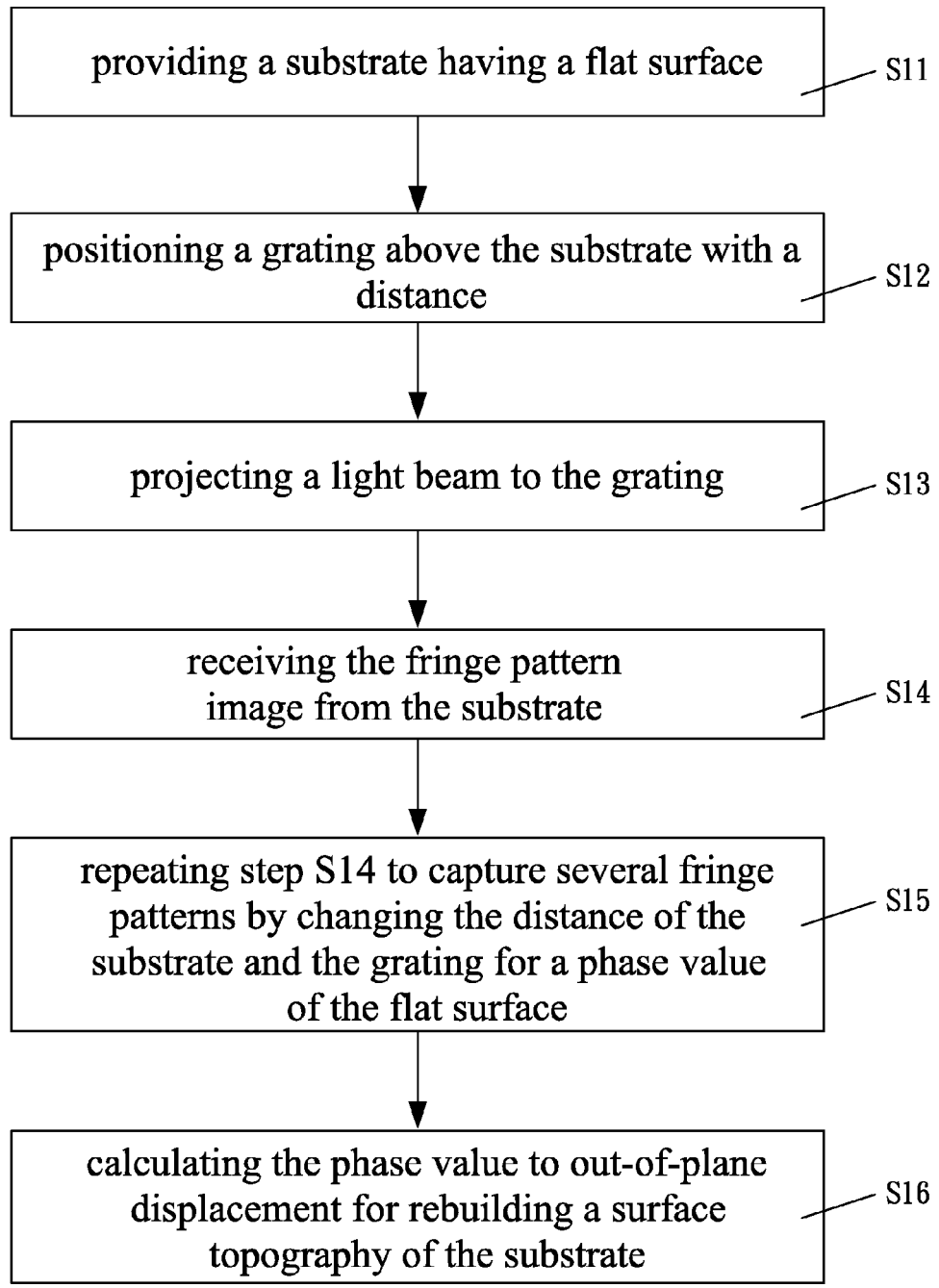
FIG. 1 is a block diagram illustrating a method for on-line real-time measuring the surface topography and out-of-plane deformation by using phase-shifting shadow moiré method according to the embodiment of the invention.

With references to FIG. 1 is a block diagram illustrating a method for on-line real-time measuring the surface topography and out-of-plane deformation by using phase-shifting shadow moiré method according to the embodiment of the invention. Step S11: providing a substrate having a flat surface. The substrate is a transparent plate or a light guide plate (LGP) for back light module, such as glass substrate, acrylic sheet, optical components and so on.

Step S12: positioning a grating above the substrate with a distance. The grating is parallel with the substrate and configured to project a light through a pattern to the flat surface. In one embodiment, the grating is made of glass with pitch 120 µm; other embodiments may use different pitch depending on the characteristic of the substrate.

Step S13: projecting a light beam to the grating, and the light beam having an incident angle to the normal of the grating. In one embodiment, a collimated light passes through the grating and be reflected by the flat surface, then the skewed shadow grating is formed.

Step S14: receiving the fringe pattern image from the substrate at other side of the normal of the grating. The light beam passes through the grating onto the flat surface and is reflected to pass the grating again for forming a fringe pattern image. In the embodiment, an image acquisition equipment is placed on the other side to capture the fringe pattern generated from interference between the grating and its projected grating on the flat surface. For better contrast, the position of image acquisition equipment is adjustable for capturing better fringe pattern.

Step S15: repeating step S14 to capture several fringe patterns by changing the distance of the substrate and the grating for a phase value of the flat surface. The captured fringe patterns are skewed, so they are recovered to be a normalized fringe pattern image with an image correction program.

Step S16: calculating the phase value to out-of-plane displacement for rebuilding a surface topography of the substrate.

Accordingly, the light beam is projected with a plurality of incident angles to receive a plurality of fringe pattern image respectively, among them a fringe pattern image with the best contrast is selected to attain a selective incident angle.

In another embodiment, the reflected light is received with a plurality of reflective angles to attain a plurality of fringe pattern image respectively, and selecting a fringe pattern image with the best contrast to attain a proper reflective angle.

Figure 2:
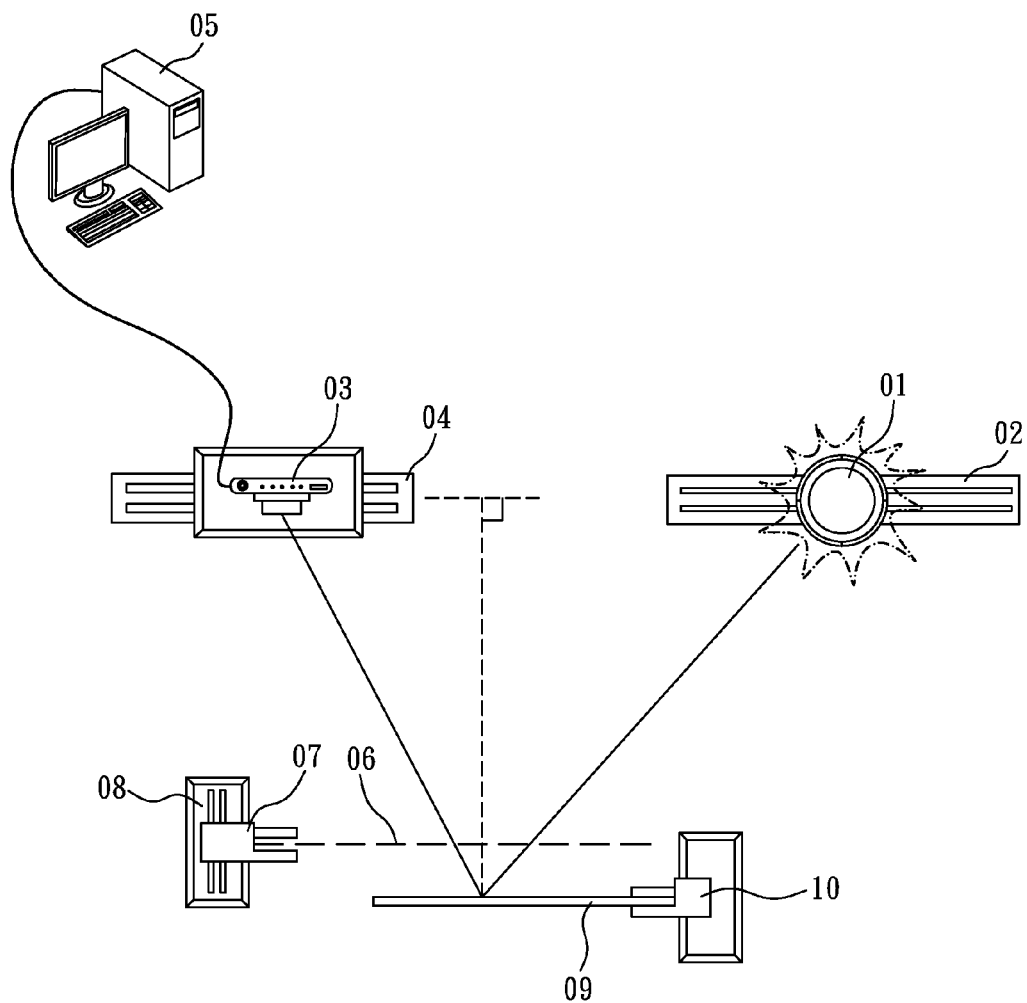
FIG. 2 is a schematic view of a system for on-line real-time measuring the surface topography and out-of-plane deformation by using phase-shifting shadow moiré method according to the embodiment of the invention.

Referring to FIG. 2 is a schematic view of a system for on-line real-time measuring the surface topography and out-of-plane deformation by using phase-shifting shadow moiré method according to the embodiment of the invention. The system for on-line real-time measuring the surface topography and out-of-plane deformation of a substrate 09 comprises a light source 01, a reference grating 06, an image acquisition apparatus 03, and a computer 05. The light source 01 projects a light beam on a substrate 09 having a test plane. The light source 09 is positioned in a light linear guide 02 for receiving the reflected light with a plurality of reflective angles (not shown) for receiving a plurality of fringe pattern image respectively to the image acquisition apparatus 03.

The image acquisition apparatus 03 is disposed above the reference grating 06 and the substrate 09 to capture at least one image comprising a shadow moiré fringe pattern, wherein the light beam passing through the reference grating 06 onto the substrate 09 and reflected to pass the reference grating 06 again for forming a fringe pattern image. The image acquisition apparatus 03 includes an acquisition linear guide 04 for receiving the reflected light with a plurality of reflective angles to capture a plurality of image respectively. In one embodiment, a CCD camera is used as the image acquisition apparatus 03 to transfer the captured image to the computer 05. In another embodiment, a CMOS camera can capture image. A computer 05 is electrically coupled to the image acquisition apparatus 03 to receive the image, and has a program module to read and process the image with phase-shift to measure a surface topography of the substrate 09.

The computer 05 can be a conventional personal computer or any data processing machine that includes a process, a memory and input/output ports. The input/output ports may include network connectivity to transfer the images to and from the storing device.

A reference grating 06 is disposed above the substrate 09 with a distance and is parallel with the substrate 09 for grading the light beam to the substrate. By analyzing the fringe pattern generated from interference between the reference grating 06 and its projected grating on the surface, the topography of the substrate 09 can be obtained.

Accordingly, a reference grating holder 07 and substrate holder 10 fix reference grating 06 and substrate 09 respectively, especially the reference grating holder 07 includes an adjustment device (not shown) to adjust the level of reference grating 06 and the substrate 09. In addition, the reference grating 06 is controlled by a distance controller 08 to adjust the distance to the substrate 09 for the operation of phase shifting. In another embodiment, moving the substrate 09 can change the distance with the reference grating 06.

Figure 3:
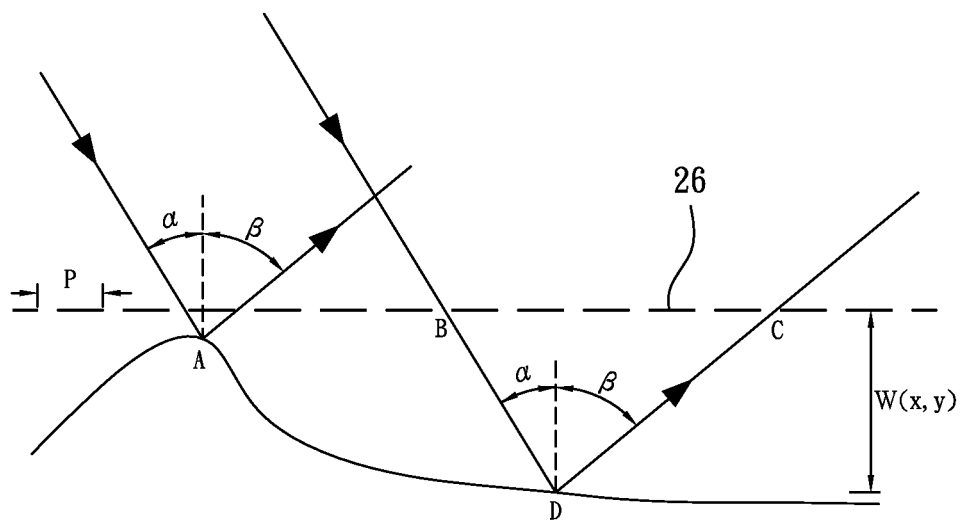
FIG. 3 is a schematic diagram of the shadow moiré method according to the embodiment of the invention.

Referring to FIG. 3 is a schematic diagram of the shadow moiré method according to the embodiment of the invention. A collimated light passes through the reference grating and be reflected by the substrate. Based on the geometrical relationship of the triangle BCD, an equation for calculation of the out-of-plane displacement can be determined as equation (1)

$$W(x, y) = N(x, y)\left(\frac{P}{\tan\alpha + \tan\beta}\right) \quad (1)$$

where W is the out-of-plane displacement of the test surface; P is the pitch of the reference grating; α is the incidence angle of the light source; β is the capture angle of an image acquisition equipment (e.g. the CCD camera); N is the fringe order. To simplify the experimental setup and subsequent calculation, β=0° is generally selected, i.e. the image acquisition equipment is normal to the surface of the substrate.

Accordingly, the light intensity of fringe pattern produced by shadow moiré method is an approximation of cosine function, as equation (2)

$$I(x,y) = I_0(x,y) + A(x,y)\cos[\phi(x,y)] \quad (2)$$

where I(x, y) is the intensity distribution of pixels in the fringe pattern; $I_0(x, y)$ is the intensity distribution of background; A(x, y) is Cosine amplitude; φ(x, y) is phase value. I(x, y) is known, and the others are unknown. To solve the unknown function, we still require at least 3 equations to solve the problem.

Accordingly, by applying phase-shifting, we have four equations (3), (4), (5), (6) to get fringe order equation (7).

$$I_1(x, y) = I_0(x, y) + A(x, y)\cos[\phi(x, y)] \quad (3)$$

$$I_2(x, y) = I_0(x, y) + A(x, y)\cos\left[\phi(x, y) - \frac{\pi}{2}\right] \quad (4)$$

$$I_3(x, y) = I_0(x, y) + A(x, y)\cos[\phi(x, y) - \pi] \quad (5)$$

$$I_4(x, y) = I_0(x, y) + A(x, y)\cos\left[\phi(x, y) - \frac{3\pi}{2}\right] \quad (6)$$

$$N(x, y) = \frac{1}{2\pi}\varphi(x, y) = \frac{1}{2\pi}\tan^{-1}\left[\frac{I_4 - I_2}{I_3 - I_1}\right] \quad (7)$$

By the phase-shifting, the fringe resolution is good and the out-of-plane displacement is accuracy.

The phase is solved through Arctan function operation, whose value is between $-\pi/2 \sim \pi/2$. The positive and negative of the numerator and the denominator will correct phase of each point between $0 \sim 2\pi$, shown table below.

| numerator sinδ | denominator cosδ | Real phase arrange | Real phase transfer function |
|---|---|---|---|
| + | + | $0 \sim \pi/2$ | φ |
| + | − | $\pi/2 \sim \pi$ | $\pi + \varphi$ |
| − | − | $\pi \sim 3\pi/2$ | $\pi + \varphi$ |
| − | + | $3\pi/2 \sim 2\pi$ | $2\pi + \varphi$ |
| 0 | + | 0 | 0 |
| 0 | − | π | π |
| + | 0 | π/2 | π/2 |
| − | 0 | 3π/2 | 3π/2 |

Accordingly, in phase unwrapping method, continuous phase information is sampled in a discrete wrapped phase. It looks for the correct integer number of phase cycles that needs to be added to each phase measurement to obtain the correct slant range distance. The Phase difference is a multiple of 2π, and unwrapped in two dimensions, the x direction can be expressed as equation (8):

$$\phi'(x_i,y) = \phi(x_i,y) + 2n_i\pi \quad (8)$$

$\phi'(x_1, y)$ is the phase in x direction after unwrapped; $\phi(x_1, y)$ is the phase before unwrapped; $n_i$ is a integer. After unwrapped, the phase of two close points must be continuous and the difference smaller than 2π and into the interval (−π, +π), shown as equation (9):

$$-\pi < \phi'(x_i,y) - \phi'(x_{i-1},y) < \pi \quad (9)$$

In another embodiment, measuring the light guide plate (LGP) by selecting several different image capture angles, the DPSSM method was used to directly obtain high contrast interference fringe pattern from the transparent LGP without painting. The LGP's surface topography was successfully obtained by the phase-shift analysis. Moreover, even for a transparent object without painting, as long as the overexposure effect can be avoided and the reflective light intensity is sufficiently high, high contrast image can be obtained when the capture angle is not too close to the incident angle of the light source. With the help of the image correction program, the skewed images obtained from oblique capture angles can be successfully recovered. Furthermore, the LGP's surface topographies obtained from different capture angles are almost the same. As a result, the surface topography of a LGP can be correctly determined Based on the experimental findings of this paper, the DPSSM method is full of potential for the on-line real-time inspection system of the LGP.

By analyzing the fringe pattern generated from interference between the reference grating 06 and its projected grating on the substrate's 09 surface, the topography of the substrate can be obtained.

From the above description, in order to obtain interference fringe patterns with high contrast, changing the capture angle of the image acquisition apparatus 03 from various oblique angles are executed. However, the obtained interference fringe pattern becomes skewed at the same time.

Therefore, the image correction program was applied to recover the skewed interference fringe pattern so that the surface topography of the substrate can be correctly determined.

Furthermore, the well-developed digital phase-shifting shadow moiré method (DPSSM) is used to measure the substrate's surface topography without painting. High intensity of reflective light was achieved by employing different capture angles in the DPSSM setup to make the interference fringe pattern sufficiently visible. Besides, with the help of the image correction program, the skewed interference fringe pattern can be successfully recovered to the image as if the image acquisition equipment is placed normal to the test surface. The substrate's surface topography can then be correctly determined.

While the invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for on-line real-time measuring the surface topography and out-of-plane deformation of a substrate by using a phase-shifting shadow moiré method, comprising:

providing a substrate having a test plane, wherein the substrate is a transparent substrate not having to first be prepared with reflective paint sprayed thereon or with other surface processing techniques, and wherein the substrate is fixed to a substrate holder at one side thereof and does not rest on any plane or platform, wherein the substrate holder is adjustable such that a distance between the substrate and a reference grating may be changed;

positioning a reference grating fixed to a reference grating holder above the substrate with a distance, wherein the reference grating is made of glass and is parallel with the substrate and configured to project a light beam through a pattern to the test plane;

projecting a light beam to the reference grating by a light source positioned in a light linear guide, wherein a plurality of incident angles to the normal of the reference grating is formed by linear movement of the light source in the light linear guide, such that a plurality of fringe pattern images are received at an other side of the normal of the reference grating, wherein a fringe pattern image with the best contrast is selected to attain a selective incident angle, and wherein the light beam passes through the reference grating onto the test plane and is reflected to pass through the reference grating again as a reflected light beam to form the plurality of fringe pattern images;

capturing the plurality of fringe pattern images by an image acquisition apparatus positioned in an acquisition linear guide, wherein a plurality of reflective angles is formed, wherein the image acquisition apparatus moves linearly in the acquisition linear guide, and wherein a fringe pattern image with the best contrast is selected to attain a proper reflective angle;

performing image correction to recover normalized fringe pattern images from each of the plurality of fringe pattern images by correcting for skew;

changing a distance between the substrate and the reference grating by adjusting the substrate to receive the plurality of fringe pattern images for a phase value of the test plane; and calculating the phase value to out-of-plane displacement to rebuild a surface topography of the substrate.

2. A system for on-line real-time measuring the surface topography and out-of-plane deformation of a substrate by using a phase-shifting shadow moiré method, comprising:

a reference grating fixed to a reference grating holder, disposed above the substrate at a distance, wherein the reference grating is made of glass and is parallel with the substrate and configured to project a light beam through a pattern to a test plane of the substrate;

a light source positioned in a light linear guide, projecting a light beam to the reference grating, wherein a plurality of incident angles to the normal of the reference grating is formed by linear movement of the light source in the light linear guide, such that a plurality of fringe pattern images are received at an other side of the normal of the reference grating, wherein a fringe pattern image with the best contrast is selected to attain a selective incident angle, and wherein the light beam passes through the reference grating onto the test plane and is reflected to pass through the reference grating again as a reflected light beam to form the plurality of fringe pattern images;

an image acquisition apparatus positioned in an acquisition linear guide, disposed above the reference grating and the substrate, capturing the plurality of fringe pattern images, wherein a plurality of reflective angles is formed, wherein the image acquisition apparatus moves linearly in the acquisition linear guide, and wherein a fringe pattern image with the best contrast is selected to attain a proper reflective angle; and a computer, electrically coupled to the image acquisition apparatus to receive the plurality of fringe pattern images, having a program module, determining a selective incident angle having a fringe pattern image with the best contrast, and determining a proper reflective angle having a fringe pattern image with the best contrast, and having an image correction program module, recovering normalized fringe pattern image from each of the plurality of fringe pattern images by correcting for skew, and having the program module reading and processing the plurality of fringe pattern images with phase-shift to measure a surface topography of the substrate, wherein the substrate is fixed to a substrate holder at one side thereof and does not rest on any plane or platform, wherein the substrate holder is adjustable such that a distance between the substrate and a reference grating may be changed, and wherein the substrate is a transparent substrate not having to first be prepared with reflective paint sprayed thereon or with other surface processing techniques.

* * * * *